United States Patent Office 3,494,900
Patented Feb. 10, 1970

3,494,900
SYNERGISTIC COMBINATIONS OF A THIAZOLE ACCELERATOR AND CERTAIN PHOSPHORODITHIOATES FOR EPDM RUBBERS
Eiichi Morita, St. Albans, W. Va., and Aubert Yaucher Coran, Creve Coeur, Mo., assignors to Monsanto Company, St. Louis, Mo., a corporation of Delaware
No Drawing. Filed Mar. 6, 1967, Ser. No. 620,667
Int. Cl. C08f 27/07
U.S. Cl. 260—79.5                                11 Claims

ABSTRACT OF THE DISCLOSURE

Synergism is shown in the cure-rate factors for EPDM rubber when vulcanization accelerator combinations are used comprised of iron, tellurium, cadmium, tin, copper, or amine salt of a phosphorodithioic acid combined with another accelerator. The second accelerator can be a thiazole, or a combination of a dithiocarbamate with a thiazole. The dithiocarbamate can be a thiuram or a salt of a dithiocarbamic acid.

BACKGROUND OF THE INVENTION

The invention pertains to the field of accelerators for the vulcanization of EPDM rubber. The U.S. patent classification is Class 260, Subclass 079.5.

Romieux and Christmann in U.S. Patent 1,867,631, assigned to the American Cyanamid Company (1932), report the accelerator properties of di-substituted phosphorodithioates for the vulcanization of rubber. This work is followed by Anderson's in U.S. Patent 2,879,243, assigned to the U.S. Rubber Company (1959), which reports thiazole accelerators activated by alkali dialkyl phosphorodithioates as accelerator combinations for the vulcanization of rubber articles formed from latex. The thiazoles are known vulcanization accelerators; for example, benzothiazyl disulfide is a commercial accelerator trademarked "Thiofide." The thiurams are known vulcanization accelerators; for example, tetramethylthiuram disulfide is a commercial accelerator trademarked "Thiurad." The salts of dithiocarbamic acids are known accelerators; for example, zinc dimethyl dithiocarbamate is a commercial accelerator trademarked "Methazate."

SUMMARY OF THE INVENTION

Synergism is shown in the cure-rate factors for EPDM rubber when vulcanization accelerator combinations of the invention are used. The combinations are comprised of an iron, tellurium, cadmium, tin, copper, or amine salt of a phosphorodithioic acid combined with another accelerator. The second accelerator can be a thiazole, or a combination of a dithiocarbamate with a thiazole. The dithiocarbamate can be a thiuram or a salt of a dithiocarbamic acid.

A fast-curring accelerator system is desirable for EPDM rubber. Shortened times for the cure-rate factors are shown in EPDM rubber stocks which contain the accelerator combinations of this invention in comparison to stocks which do not contain the salts of phosphorodithioic acids of this invention. The time for incipient vulcanization is shortened for EPDM stocks which contain the accelerator combinations of this invention in comparison to the stocks which do not contain the salts of phosphorodithioic acids of this invention. The accelerator combinations of this invention provide improved curing systems for EPDM rubber which are faster curing than the accelerators when used as single elements in EPDM.

The salts of phosphorodithioic acids useful in this invention are compounds of either:

Formula A

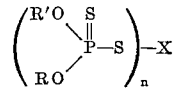

or

Formula B

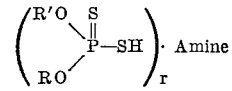 · Amine

The R and R' in both formulas are straight or branched alkyl, aryl, alicyclic, alkenyl, aralkyl, or alkaryl radicals of less than 19 carbon atoms. R and R' can be the same or different radicals. In Formula A, $n$ is 2 when X is iron, cadmium, tin, or copper. In Formula A, $n$ is 3 when X is iron. In Formula A, $n$ is 4 when X is tellurium or tin. In Formula B, the amine can be a primary, secondary, or tertiary amine. In Formula B, $r$ is 1 when the amine is diethylamine, cyclohexylamine, tert-butylamine, monoethanolamine, diethanolamine, triethanolamine, diisopropanolamine, triisopropanolamine, morpholine, piperidine, or 3-azabicyclo[3.2.2]nonane. In Formula B, $r$ is 2 when the amine is piperazine. Some examples of the salts of phosphorodithioic acids useful in this invention are as follows:

S-tellurium O,O-di-n-butyl phosphorodithioate
S-tellurium O,O-diisopropyl phosphorodithioate
S-tellurium O,O-dipropyl phosphorodithioate
S-tellurium O,O-diethyl phosphorodithioate
S-tellurium O,O-dimethyl phosphorodithioate
S-tellurium O,O-bis(1,3-dimethylbutyl)phosphorodithioate
S-tellurium O,O-bis(2-ethylhexyl)phosphorodithioate
S-tellurium O,O-bis(4-methylpentyl)phosphorodithioate
S-tellurium O,O-ditridecyl phosphorodithioate
S-tellurium O,O-diamyl phosphorodithioate
S-tellurium O,O-dihexyl phosphorodithioate
S-tellurium O,O-dilauryl phosphorodithioate
S-tellurium O,O-dioctadecyl phosphorodithioate
S-tellurium O,O-dioctyl phosphorodithioate
S-iron O,O-dibutyl phosphorodithioate
S-iron O,O-diisopropyl phosphorodithioate
S-iron O,O-dipropyl phosphorodithioate
S-iron O,O-diethyl phosphorodithioate
S-iron O,O-dimethyl phosphorodithioate
S-iron O,O-bis(1,3-dimethylbutyl)phosphorodithioate
S-iron O,O-bis(2-ethylhexyl)phosphorodithioate
S-iron O,O-bis(4-methylpentyl)phosphorodithioate
S-iron O,O-ditridecyl phosphorodithioate
S-iron O,O-diamyl phosphorodithioate
S-iron O,O-dihexyl phosphorodithioate
S-iron O,O-dilauryl phosphorodithioate
S-iron O,O-dioctadecyl phosphorodithioate
S-iron O,O-dioctyl phosphorodithioate
S-cadmium O,O-dibutyl phosphorodithioate
S-cadmium O,O-diisopropyl phosphorodithioate
S-cadmium O,O-dipropyl phosphorodithioate
S-cadmium O,O-diethyl phosphorodithioate
S-cadmium O,O-dimethyl phosphorodithioate
S-cadmium O,O-bis(1,3-dimethylbutyl)phosphorodithioate
S-cadmium O,O-bis(2-ethylhexyl)phosphorodithioate
S-cadmium O,O-bis(4-methylpentyl)phosphorodithioate
S-cadmium O,O-ditridecyl phosphorodithioate
S-cadmium O,O-diamyl phosphorodithioate
S-cadmium O,O-dihexyl phosphorodithioate
S-cadmium O,O-dilauryl phosphorodithioate
S-cadmium O,O-dioctadecyl phosphorodithioate
S-cadmium O,O-dioctyl phosphorodithioate S-tin O,O-dibutyl phosphorodithioate
S-tin O,O-diisopropyl phosphorodithioate
S-tin O,O-dipropyl phosphorodithioate
S-tin O,O-diethyl phosphorodithioate
S-tin O,O-dimethyl phosphorodithioate
S-tin O,O-bis (1,3-dimethylbutyl)phosphorodithioate
S-tin O,O-bis(2-ethylhexyl)phosphorodithioate
S-tin O,O-bis(4-methylpentyl)phosphorodithioate
S-tin O,O-ditridecyl phosphorodithioate
S-tin O,O-diamyl phosphorodithioate
S-tin O,O-dihexyl phosphorodithioate
S-tin O,O-dilauryl phosphorodithioate
S-tin O,O-dioctadecyl phosphorodithioate
S-tin O,O-dioctyl phosphorodithioate
S-copper O,O-dibutyl phosphorodithioate
S-copper O,O-diisopropyl phosphorodithioate
S-copper O,O-dipropyl phosphorodithioate
S-copper O,O-diethyl phosphorodithioate
S-copper O,O-dimethyl phosphorodithioate
S-copper O,O-bis(1,3-dimethylbutyl)phosphorodithioate
S-copper O,O-bis(2-ethylhexyl)phosphorodithioate
S-copper O,O-bis(4-methylpentyl)phosphorodithioate
S-copper O,O-ditridecyl phosphorodithioate
S-copper O,O-diamyl phosphorodithioate
S-copper O,O-dihexyl phosphorodithioate
S-copper O,O-dilauryl phosphorodithioate
S-copper O,O-dioctadecyl phosphorodithioate
S-copper O,O-dioctyl phosphorodithioate
Tert-butylamine salt of O,O-di-n-butyl phosphorodithioic acid
Diethylamine salt of O,O-di-n-butyl phosphorodithioic acid
Cyclohexylamine salt of O,O-di-n-butyl phosphorodithioic acid
Morpholine salt of O,O-di-n-butyl phosphorodithioic acid
Monoethanolamine salt of O,O-di-n-butyl phosphorodithioic acid
Diethanolamine salt of O,O-di-n-butyl phosphorodithioic acid
Triethanolamine salt of O,O-di-n-butyl phosphorodithioic acid
Diisopropanolamine salt of O,O-di-n-butyl phosphorodithioic acid
Triisopropanolamine salt of O,O-di-n-butyl phosphorodithioic acid
Piperazine salt of O,O-di-n-butyl phosphorodithoic acid
Piperidine salt of O,O-di-n-butyl phosphorodithioic acid
3-azabicyclo[3.2.2]nonane salt of O,O-di-n-butyl phosphorodithioic acid Some examples of the thiazole accelerators which are used in the practice of this invention include the following:

2-mercaptobenzothiazole
Sodium 2-mercaptobenzothiazole
Zinc 2-mercaptobenzothiazole
2,2'-dithiobisbenzothiazole
2-(morpholinothio)benzothiazole
2-benzothiazolyl 1-hexamethyleniminecarbodithioate
2-benzothiazolyl-thiolbenzoate
1,3-bis(2-benzothiazolyl-mercaptomethyl)urea
2-(2,4-dinitrophenylthio)benzothiazole
S-(2-benzothiazolyl)N,N-diethyl dithiocarbamate
N-cyclohexylbenzothiazole-2-sulfenamide
N-tert-butylbenzothiazole-2-sulfenamide The thiurams are a well-known class of accelerators. Some examples of the thiurams useful in this invention are as follows:

Tetramethylthiuram monosulfide
Tetramethylthiuram disulfide
Tetramethylthiuram trisulfide
Tetramethylthiuram tetrasulfide
Tetraethylthiuram monosulfide
Tetraethylthiuram disulfide
Tetraethylthiuram trisulfide
Tetraethylthiuram tetrasulfide
Tetrapropylthiuram monosulfide
Tetrapropylthiuram disulfide
Tetrapropylthiuram trisulfide
Tetrapropylthiuram tetrasulfide
Tetraisopropylthiuram monosulfide
Tetraisopropylthiuram disulfide
Tetraisopropylthiuram trisulfide
Tetraisopropylthiuram tetrasulfide
Tetrabutylthiuram monosulfide
Tetrabutylthiuram disulfide
Tetrabutylthiuram trisulfide
Tetrabutylthiuram tetrasulfide The salts of dithiocarbamic acids are a well-known class of accelerators. Some examples of the salts of dithiocarbamic acids useful in this invention are as follows:

Zinc dimethyl dithiocarbamate
Zinc diethyl dithiocarbamate
Zinc dibutyl dithiocarbamate
Cadmium diethyl dithiocarbamate
Selenium diethyl dithiocarbamate
Tellurium diethyl dithiocarbamate
Piperidinium pentamethylene dithiocarbamate
N,N-dimethylcyclohexylamine salt of dibutyl dithiocarbamic acid The invention is useful in EPDM rubber. The American Society for Testing Materials (ASTM), defines EPDM in the 1965 Book of ASTM Standards, Part 28, page 695, as follows: "EPDM-Terpolymer containing ethylene and propylene in the backbone and a diene in the side chain." Amberg discusses the dienes which have been used with ethylene and propylene in Vulcanization of Elastomers 324, 325 (Alliger and Sjothum ed. 1963). Amberg states: "Good results have been obtained with compounds which have one internal and one terminal double bond. Dicyclopentadiene is one of the preferred dienes. 2-methylene-norbornene and 11-ethyl-1,11-tridecadiene are examples of other monomers which react satisfactorily." Cyclooctadiene and 1,4-hexadiene are also used as the diene monomer of EPDM.

PREFERRED EMBODIMENTS

The curing characteristics in the tables, infra, are obtained by testing EPDM with various accelerators and accelerator combinations in a Mooney Viscometer and a Monsanto Oscillating Disk Rheometer.

The Mooney Viscometer tests are run at 135° C. The Mooney Viscometer is a curemeter with a rotating disk embedded in a rubber sample. The $t_5$ is the time in minutes required for the Mooney reading to rise 5 points above the minimum viscosity of the rubber sample. The $t_5$ indicates scorch time for the EPDM sample. Scorch time is the time required for incipient vulcanization of a rubber sample. The $t_{35}$–$t_5$ is a cure-rate factor and is the time required for an increase of 30 Mooney units above $t_5$. The Mooney Viscometer method of determining curing characteristics has the American Society for Testing Materials (ASTM) Designation, D-1646-63.

The Monstanto Oscillating Disk Rheometer is a curemeter with an oscillating disk embedded in a rubber sample. The $t_2$ is the time in minutes for a rise of two rheometer units above the minimum reading. The $t_2$ indicates scorch time for the EPDM sample. The $t_{90}$ is the time required to obtain a torque 90% of the maximum. The $t_{90}$ indicates the cure time for a rubber sample. $R_{max.}$ is the maximum torque and $R_{min.}$ is the minimum torque. The Monsanto Oscillating Disk Rheometer is described by Decker, Wise, and Guerry, Rubber World, December 1962, page 68.

The stress-strain data in the tables, showing moduli at 300% elongation, ultimate tensile strength, and elongation are obtained using the method of the ASTM Designation, D-412-64T. The method covers the determination of the effect of the application of a tension load to a vulcanized sample of EPDM containing an accelerator or accelerator combination of this invention. The modulus at 300% elongation is calculated as follows:

$$\text{Modulus at 300\% elongation in lbs./in.}^2 = \frac{\text{Force at 300\%}}{\text{Original cross-sectional area of the sample}}$$

The data in Table I show curing characteristics of EPDM containing the accelerators benzothiazyl disulfide, tetramethylthiuram monosulfide, and S-tellurium O,O-di-n-butyl phosphorodithioate. The data in Table I illustrate the enhanced effectiveness of each accelerator when combinations of accelerator containing S-tellurium O,O-di-n-butyl phosphorodithioate are used. The EPDM used in the tests reported in Tables I and III is trademarked "Royalene 301" by the United States Rubber Company. The EPDM is compounded into the following masterbatch.

| Masterbatch ingredients: | Parts by weight |
|---|---|
| EPDM | 100 |
| Carbon black | 200 |
| Oil softener | 100 |
| Zinc oxide | 5 |
| Stearic acid | 1 |
| Sulfur | 2 |

The compounded EPDM rubber samples of Table I contain the following curing systems of accelerators or accelerator combinations:

| Stock | Curing System | Parts by Weight |
|---|---|---|
| 1 | Tetramethylthiuram monosulfide | 3 |
| 2 | S-tellurium O,O-di-n-butyl phosphorodithioate | 3 |
| 3 | {S-tellurium O,O-di-n-butyl phosphorodithioate | 2 |
|   | {Benzothiazyl disulfide | 1 |
| 4 | Benzothiazyl disulfide | 3 |
| 5 | {Tetramethylthiuram monosulfide | 1 |
|   | {Benzothiazyl disulfide | 2 |
| 6 | {Tetramethylthiuram monosulfide | 1.2 |
|   | {S-tellurium O,O-di-n-butyl phosphorodithioate | 1.2 |
|   | {Benzothiazyl disulfide | 0.6 |
| 7 | {Tetramethylthiuram monosulfide | 0.8 |
|   | {S-tellurium O,O-di-n-butyl phosphorodithioate | 1.2 |
|   | {Benzothiazyl disulfide | 1.0 |

TABLE I

| Stock | 1 | 2 | 3 | 4 | 5 | 6 | 7 |
|---|---|---|---|---|---|---|---|
| Mooney Scorch at 135° C.: | | | | | | | |
| $t_5$ | 30.3 | 22.8 | 21.7 | 77.8 | 24.7 | 21.8 | 21.7 |
| $t_{35}-t_5$ | 14.5 | 18.0 | 10.1 | (*) | 14.1 | 7.9 | 9.1 |
| Rheometer at 160° C.: | | | | | | | |
| $R_{max}$ | 43.8 | 37.1 | 38.4 | 24.1 | 36.8 | 41.0 | 38.1 |
| $R_{min}$ | 3.1 | 3.0 | 3.0 | 3.1 | 3.2 | 3.5 | 3.2 |
| $t_2$ | 10.3 | 6.7 | 7.0 | 18.4 | 8.0 | 7.2 | 7.0 |
| $t_{90}$ | 30.1 | 40.2 | 30.0 | 96.0 | 35.2 | 29.0 | 29.6 |
| Stress-Strain—Cure at 160° C. for— | \multicolumn{7}{c}{Modulus at 300% Elongation} | | | | | | |
| 35 minutes | | | 1,140 | | | 1,200 | 1,150 |
| 40 minutes | | 1,120 | | | 1,120 | | |
| 50 minutes | | 1,150 | 1,250 | 870 | 1,180 | | 1,180 |
| 120 minutes | | | | 880 | | | |
| | \multicolumn{7}{c}{Ultimate Tensile Strength} | | | | | | |
| 35 minutes | 1,280 | | 1,200 | | | 1,290 | 1,240 |
| 40 minutes | | 1,140 | | | 1,190 | | |
| 50 minutes | 1,340 | 1,270 | 1,270 | 720 | 1,250 | 1,300 | 1,240 |
| 120 minutes | | | | 1,000 | | | |
| | \multicolumn{7}{c}{Elongation} | | | | | | |
| 35 minutes | 290 | | 340 | | | 340 | 330 |
| 40 minutes | | 300 | | | 350 | | |
| 50 minutes | 290 | 340 | 320 | 480 | 340 | 280 | 340 |
| 120 minutes | | | | 350 | | | |

*The Mooney Scorch test was stopped before a $t_{35}$ Mooney unit rise because the cure was too slow.

The cure-rate factors ($t_{35}-t_5$) of Stocks 3, 6, and 7 of Table I illustrate the enhanced effectiveness of the accelerator combinations of this invention. Each stock containing S-tellurium O,O-di-n-butyl phosphorodithioate in a combination of this invention shows a faster cure rate than Stocks 1, 4 and 5 which do not contain the tellurium salt or Stock 2 which contains the tellurium salt alone.

The EPDM used in the tests reported in Tables II, IV, V, and VI is trademarked "Nordel 1070" by E. I. du Pont de Nemours and Company. The EPDM for Tables II, IV, V, and VI is compounded into the following masterbatch:

| Masterbatch ingredients: | Parts by weight |
|---|---|
| EPDM | 100 |
| Zinc oxide | 5 |
| Carbon black | 80 |
| Aromatic processing oil | 40 |
| Sulfur | 1.5 |

The compounded EPDM samples of Table II contain the following curing systems of accelerator combinations:

| Stock | Curing System | Parts by Weight |
|---|---|---|
| 1 | {Tetramethylthiuram monosulfide | 0.5 |
|   | {Benzothiazyl disulfide | 1.5 |
| 2 | {Tetramethylthiuram monosulfide | 0.5 |
|   | {Benzothiazyl disulfide | 1.5 |
|   | {S-cadmium O,O-di-n-butyl phosphorodithioate | 2.0 |
| 3 | {Tetramethylthiuram monosulfide | 0.5 |
|   | {Benzothiazyl disulfide | 1.5 |
|   | {S-tellurium O,O-di-n-butyl phosphorodithioate | 2.0 |
| 4 | {Tetramethylthiuram monosulfide | 0.5 |
|   | {Benzothiazyl disulfide | 1.5 |
|   | {S-iron O,O-di-n-butyl phosphorodithioate | 2.0 |
| 5 | {Tetramethylthiuram monosulfide | 0.5 |
|   | {Benzothiazyl disulfide | 1.5 |
|   | {S-tin O,O-di-n-butyl phosphorodithioate | 2.0 |
| 6 | {Tetramethylthiuram monosulfide | 0.5 |
|   | {Benzothiazyl disulfide | 1.5 |
|   | {S-copper O,O-di-n-butyl phosphorodithioate | 2.0 |

TABLE II

| Stock | 1 | 2 | 3 | 4 | 5 | 6 |
|---|---|---|---|---|---|---|
| Mooney Scorch at 135° C.: | | | | | | |
| $t_5$ | 13.5 | 10.3 | 12.5 | 13.9 | 9.2 | 10.9 |
| $t_{35}-t_5$ | 6.3 | 4.6 | 5.2 | 5.6 | 4.2 | 3.3 |
| Rheometer at 160° C.: | | | | | | |
| $R_{max}$ | 60.1 | 68.3 | 69.6 | 68.3 | 66.8 | 66.7 |
| $R_{min}$ | 7.9 | 8.3 | 8.1 | 7.6 | 8.0 | 7.6 |
| $t_2$ | 4.8 | 4.2 | 6.6 | 6.1 | 4.1 | 4.3 |
| $t_{90}$ | 28.2 | 19.0 | 18.6 | 18.6 | 17.0 | 17.3 |
| Stress-Strain—Cure at 160° C. for— | \multicolumn{6}{c}{Modulus at 300% Elongation} | | | | | |
| 40 minutes | | *1,780 | *1,900 | *1,750 | *1,800 | *1,840 |
| 70 minutes | *1,680 | | | | | |
| | \multicolumn{6}{c}{Ultimate Tensile Strength} | | | | | |
| 40 minutes | | *2,900 | *2,800 | *2,900 | *2,800 | *2,900 |
| 70 minutes | *3,000 | | | | | |
| | \multicolumn{6}{c}{Ultimate Elongation} | | | | | |
| 40 minutes | | *450 | *430 | *470 | *450 | *440 |
| 70 minutes | *490 | | | | | |

*Optimum cure of sample.

The cure rate factors ($t_{35}-t_5$) of the Mooney data and the Rheometer data, $t_{90}$, in Table II illustrate the enhanced effectiveness of the accelerator combinations of this invention. Stocks 2, 3, 4, 5, and 6 of Table II which contain accelerator combinations of this invention, show a faster cure rate than Stock 1 which contains the accelerators, tetramethylthiuram monosulfide and benzothiazyl disulfide, only.

The data in Table III show curing characteristics of EPDM containing an accelerator combination of this invention comprised of the t-butylamine salt of O,O-di-n-butyl phosphorodithioic acid and benzothiazyl disulfide. The compounded EPDM rubber samples of Table III contain the following curing systems of accelerators or accelerator combinations:

| Stock | Curing System | Parts by Weight |
|---|---|---|
| 1 | Benzothiazyl disulfide | 3.0 |
| 2 | {Benzothiazyl disulfide | 1 |
|   | {Tert-butylamine salt of O,O-di-n-butyl phosphorodithioic acid. | 2 |
| 3 | Tert-butylamine salt of O,O-di-n-butyl phosphorodithioic acid. | 3 |

TABLE III

| Stock | 1 | 2 | 3 |
|---|---|---|---|
| Mooney Scorch at 135° C.: | | | |
| $t_5$ | 84.5 | 28.2 | 20.3 |
| $t_{35}-t_5$ | 129.5 | 38.4 | 64.3 |
| Rheometer at 160° C.: | | | |
| $R_{max}$ | 22.5 | 37.0 | 28.2 |
| $t_2$ | 23.0 | 7.0 | 10.8 |
| $t_{90}$ | 77.0 | 47.0 | 65.1 |
| Modulus at 300% Elongation | | | |
| Stress-Strain—Cure at 160° C. for— | | | |
| 50 minutes | | 1,140 | |
| 60 minutes | | | 1,000 |
| 70 minutes | | *1,200 | |
| 80 minutes | 750 | | *1,100 |
| 120 minutes | *950 | | |
| Ultimate Tensile Strength | | | |
| 50 minutes | | 1,200 | |
| 60 minutes | | | 1,100 |
| 70 minutes | | *1,300 | |
| 80 minutes | 900 | | *1,200 |
| 120 minutes | *1,100 | | |
| Ultimate Elongation | | | |
| 50 minutes | | 350 | |
| 60 minutes | | | 370 |
| 70 minutes | | *370 | |
| 80 minutes | 420 | | *360 |
| 120 minutes | *380 | | |

*Optimum cure of sample.

The cure-rate factor ($t_{35}-t_5$) of the Mooney data and the Rheometer data, $t_{90}$, in Table III illustrate the enhanced effectiveness of an accelerator combination of this invention containing the t-butyl amine salt of O,O-di-n-butyl phosphorodithioic acid and benzothiazyl disulfide. The cure rate of the EPDM sample containing the combination (Stock 2) is faster than Stocks 1 and 3 which contain the single elements of the combination in Table III.

The compounded EPDM rubber samples of Table IV contain the following curing systems of accelerator combinations:

| Stock | Curing System | Parts by Weight |
|---|---|---|
| 1 | Tetramethylthiuram monosulfide | 0.5 |
| | Benzothiazyl disulfide | 1.5 |
| 2 | Monoethanolamine salt of O,O-di-n-butyl phosphorodithioic acid. | 2.0 |
| | Tetramethylthiuram monosulfide | 0.5 |
| | Benzothiazyl disulfide | 1.5 |
| 3 | Diethanolamine salt of O,O-di-n-butyl phosphorodithioic acid. | 2.0 |
| | Tetramethylthiuram monosulfide | 0.5 |
| | Benzothiazyl disulfide | 1.5 |
| 4 | Triethanolamine salt of O,O-di-n-butyl phosphorodithioic acid. | 2.0 |
| | Tetramethylthiuram monosulfide | 0.5 |
| | Benzothiazyl disulfide | 1.5 |
| 5 | Piperazine salt of O,O-di-n-butyl phosphorodithioic acid. | 2.0 |
| | Tetramethylthiuram monosulfide | 0.5 |
| | Benzothiazyl disulfide | 1.5 |
| 6 | Diisopropanolamine salt of O,O-di-n-butyl phosphorodithioic acid. | 2.0 |
| | Tetramethylthiuram monosulfide | 0.5 |
| | Benzothiazyl disulfide | 1.5 |
| 7 | Triisopropanolamine salt of O,O-di-n-butyl phosphorodithioic acid. | 2.0 |
| | Tetramethylthiuram monosulfide | 0.5 |
| | Benzothiazyl disulfide | 1.5 |

TABLE IV

| Stock | 1 | 2 | 3 | 4 | 5 | 6 | 7 |
|---|---|---|---|---|---|---|---|
| Mooney Scorch at 135° C.: | | | | | | | |
| $t_5$ | 13.9 | 4.0 | 5.3 | 5.6 | 6.9 | 6.3 | 6.4 |
| $t_{35}-t_5$ | 6.4 | 1.5 | 2.3 | 1.9 | 3.1 | 2.2 | 2.5 |
| Rheometer at 160° C.: | | | | | | | |
| $R_{max}$ | 56.7 | 64.0 | 60.0 | 55.8 | 61.5 | 55.1 | 56.6 |
| $R_{min}$ | 7.0 | 8.5 | 7.1 | 6.5 | 6.7 | 6.3 | 7.2 |
| $t_2$ | 5.6 | 2.0 | 2.1 | 2.5 | 2.6 | 2.6 | 2.9 |
| $t_{90}$ | 29.1 | 14.3 | 18.4 | 21.2 | 15.6 | 15.8 | 16.0 |
| Modulus at 300% Elongation | | | | | | | |
| Stress-Strain—Cure at 160° C. for— | | | | | | | |
| 30 minutes | *1,450 | | | | | | |
| 40 minutes | | *1,390 | *1,130 | *1,540 | *1,360 | *1,480 | |
| 60 minutes | *1,500 | | | | | | |
| Ultimate Tensile Strength | | | | | | | |
| 30 minutes | *3,100 | | | | | | |
| 40 minutes | | *3,200 | *2,900 | *3,000 | *2,900 | *3,200 | |
| 60 minutes | *3,200 | | | | | | |
| Ultimate Elongation | | | | | | | |
| 30 minutes | *500 | | | | | | |
| 40 minutes | | *550 | *580 | *500 | *520 | *550 | |
| 60 minutes | *540 | | | | | | |

*Optimum cure of sample.

The cure-rate factors ($t_{35}-t_5$) of the Mooney data and the Rheometer data, $t_{90}$, in Table IV illustrate the enhanced effectiveness of the accelerator combinations of this invention. Each stock in Table IV containing an accelerator combination of this invention (Stocks 2, 3, 4, 5, 6, and 7) shows a faster rate than Stock 1 which contains tetramethylthiuram monosulfide and benzothiazyl disulfide only.

The compounded EPDM rubber samples of Table V contain the following curing systems of accelerator combinations:

| Stock | Curing System | Parts by Weight |
|---|---|---|
| 1 | Tetramethylthiuram monosulfide | 0.5 |
| | Benzothiazyl disulfide | 1.5 |
| 2 | 3-azabicyclo[3.2.2]nonane salt of O,O-di-n-butyl phosphorodithioic acid. | 2.0 |
| | Tetramethylthiuram monosulfide | 0.5 |
| | Benzothiazyl disulfide | 1.5 |
| 3 | Piperidine salt of O,O-di-n-butyl phosphorodithioic acid. | 2.0 |
| | Tetramethylthiuram monosulfide | 0.5 |
| | Benzothiazyl disulfide | 1.5 |

TABLE V

| Stock | 1 | 2 | 3 |
|---|---|---|---|
| Mooney Scorch at 135° C.: | | | |
| $t_5$ | 13.6 | 6.7 | 6.6 |
| $t_{35}-t_5$ | 6.0 | 3.4 | 3.3 |
| Rheometer at 160° C.: | | | |
| $t_2$ | 5.2 | 2.8 | 3.1 |
| $t_{90}$ | 28.3 | 16.2 | 16.0 |
| $R_{min}$ | 8.2 | 8.0 | 7.9 |
| $R_{max}$ | 61.0 | 63.6 | 65.9 |
| Modulus at 300% Elongation | | | |
| Stress-Strain—Cure at 160° C. for— | | | |
| 30 minutes | | *1,500 | |
| 35 minutes | | | *1,640 |
| 60 minutes | *1,770 | | |
| Ultimate Tensile Strength | | | |
| 30 minutes | | *3,000 | |
| 35 minutes | | | *2,900 |
| 60 minutes | *3,400 | | |
| Ultimate Elongation | | | |
| 30 minutes | | *520 | |
| 35 minutes | | | *480 |
| 60 minutes | *530 | | |

*Optimum cure of sample.

The cure-rate factors ($t_{35}-t_5$) of the Mooney data and the Rheometer data, $t_{90}$, of Table V illustrate the enhanced effectiveness of the accelerator combinations of this invention. Stocks 2 and 3 of Table V, which contain accelerator combinations of this invention, show a faster cure rate than Stock 1.

The compounded EPDM rubber samples of Table VI contain the following curing systems of accelerator combinations:

| Stock | Curing System | Parts by Weight |
|---|---|---|
| 1 | Tetramethylthiuram monosulfide | 0.5 |
|   | Benzothiazyl disulfide | 1.5 |
| 2 | Morpholine salt of O,O-di-n-butyl phosphorodithioic acid | 2.0 |
|   | Tetramethylthiuram monosulfide | 0.5 |
|   | Benzothiazyl disulfide | 1.5 |

TABLE VI

| Stock | 1 | 2 |
|---|---|---|
| Mooney Scorch at 135° C.: | | |
| $t_5$ | 14.1 | 7.9 |
| $t_{35}-t_5$ | 7.5 | 3.9 |
| Rheometer at 160° C.: | | |
| $t_2$ | 5.2 | 3.1 |
| $t_{90}$ | 27.8 | 15.9 |

The cure-rate factor ($t_{35}-t_5$) of the Mooney data and the Rheometer data, $t_{90}$, of Table VI illustrate the enhanced effectiveness of the accelerator combinations of this invention. Stock 2 of Table VI, which contains an accelerator combination of this invention, shows a faster cure rate than Stock 1.

Comparable results to those in the tables, supra, are obtained with accelerator combinations of this invention not illustrated. Analogous results to those in the tables, supra, are obtained in EPDM vulcanization when the parts by weight ratio of phosphorodithioate to 20 parts thiazole accelerator or 20 parts thiazole-dithiocarbamate accelerator combination is varied as much as .5 to 60. The preferred range is 10 to 60. Accelerating effect is observed over a wide range of total accelerator, for example 0.5 to 10 parts per hundred parts of EPDM, but at least 1.0 part per hundred parts of EPDM is preferred. The invention is useful for accelerating non-black stocks. The tellurium salts of this invention increase the resistance to reversion of EPDM stocks.

It is intended to cover all changes and modifications of the examples of the invention herein chosen for purposes of disclosure which do not constitute departures from the spirit and scope of the invention.

What is claimed is:
1. A method of vulcanizing sulfur-vulcanizable EPDM rubber which comprises:
   mixing the EPDM rubber with a sulfur-containing vulcanizing agent and an accelerating amount of a vulcanization accelerator combination comprised of a salt of a phosphorodithioic acid of the formulas

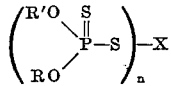

or

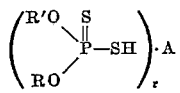

wherein R and R' are alkyl, aryl, alicyclic, alkenyl, aralkyl, or alkaryl of less than 19 carbon atoms; X is iron, cadmium or tin and n is 2; X is iron and n is 3; X is tellurium or tin and n is 4; and A is a primary, secondary, or tertiary amine and r is 1 or 2; and
   (1) a thiazole accelerator; or
   (2) a thiazole and a salt of a dithiocarbamic acid or a thiuram sulfide; and
heating the mixture at a vulcanizing temperature.

2. A vulcanized EPDM rubber product obtained by the method of claim 1.

3. A method of vulcanizing sulfur-vulcanizable EPDM rubber according to claim 1 wherein the salt of phosphorodithioic acid is of the formula

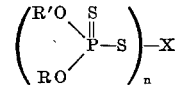

wherein R and R' are alkyl, aryl, alicyclic, alkenyl, aralkyl, or alkaryl of less than 19 carbon atoms; X is iron, cadmium or tin and n is 2; X is iron and n is 3; or X is tellurium or tin and n is 4.

4. A method of vulcanizing sulfur-vulcanizable EPDM rubber according to claim 3 wherein the accelerator combination is comprised of S-tellurium O,O-di-n-butyl phosphorodithioate and
   (1) benzothiazyl disulfide or
   (2) benzothiazyl disulfide and tetramethylthiuram monosulfide.

5. A method of vulcanizing sulfur-vulcanizable EPDM rubber according to claim 3 wherein the accelerator combination is comprised of S-cadmium O,O-di-n-butyl phosphorodithioate and
   (1) benzothiazyl disulfide or
   (2) benzothiazyl disulfide and tetramethylthiuram monosulfide.

6. A method of vulcanizing sulfur-vulcanizable EPDM rubber according to claim 1 wherein the salt of phosphorodithioic acid is of the formula

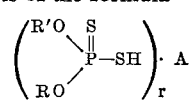

wherein R and R' are alkyl, aryl, alicyclic, alkenyl, aralkyl, or alkaryl of less than 19 carbon atoms; and A is diethylamine, cyclohexylamie, tert-butylamine, monethanolamine, diethanolamine, triethanolamine, diisopropanolamine, triisopropanolamine, morpholine, piperidine, or 3-azabicyclo[3.2.2]nonane and r is 1; or A is piperazine and r is 2.

7. A method of vulcanizing sulfur-vulcanizable EPDM rubber according to claim 6 wherein the accelerator combination is comprised of tert-butylamine salt of O,O-di-n-butyl phosphorodithioic acid and
   (1) benzothiazyl disulfide or
   (2) benzothiazyl disulfide and tetramethylthiuram monosulfide.

8. A vulcanization accelerator combination comprised of
   a salt of a phosphorodithioic acid of the formulas

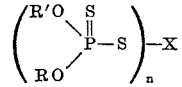

or

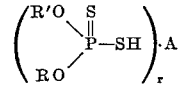

wherein R and R' are alkyl, aryl, alicyclic, alkenyl, aralkyl, or alkaryl of less than 19 carbon atoms; X is iron, cadmium or tin and n is 2; X is iron and n is 3; or X is tellurium or tin and n is 4; and A is diethylamine, cyclohexylamine, tert - butylamine, monoethanolamine, diethanolamine, triethanolamine, diisopropanolamine, triisopropanolamine, morpholine, piperidine, or 3-azabicyclo[3.2.2]nonane and r is 1 or A is piperazine and r is 2; and
   (1) a thiazole accelerator; or
   (2) a thiazole and a salt of a diethiocarbamic acid or a thiuram sulfide.

9. A vulcanization accelerator combination according to claim 8 comprised of S-tellurium O,O-di-n-butyl phosphorodithioate and
   (1) benzothiazyl disulfide or
   (2) benzothiazyl disulfide and tetramethylthiuram monosulfide.

10. A vulcanization accelerator combination according to claim 8 comprised of S-cadmium O,O-di-n-butyl phosphorodithioate and
  (1) benzothiazyl disulfide or
  (2) benzothiazyl disulfide and tetramethylthiuram monosulfide.

11. A vulcanization accelerator combination according to claim 8 comprised of the tert-butylamine salt of O,O-di-n-butyl phosphorodithioic acid and
  (1) benzothiazyl disulfide or
  (2) benzothiazyl disulfide and tetramethylthiuram monosulfide.

References Cited

UNITED STATES PATENTS

| | | | |
|---|---|---|---|
| 2,063,629 | 12/1936 | Salzberg et al. | 260—924 |
| 2,879,243 | 3/1959 | Anderson | 260—29.7 |
| 3,308,103 | 3/1967 | Coran | 260—79.5 |
| 3,400,106 | 9/1968 | Morita | 260—79.5 |

OTHER REFERENCES

Gorton, A., Rubber Development, 18(3) (1965) pp. 94–96.

Chem. Abst., 66, 66486 g.

Hofmann, W., Vulcanization, Palmerton, N.Y. (1965), p. 111.

JOSEPH L. SCHOFER, Primary Examiner

C. A. HENDERSON, JR., Assistant Examiner

U.S. Cl X.R.

260—23.7, 239, 247, 268, 293, 429, 429.7, 438.1, 439, 785, 791, 792, 793, 925